United States Patent Office 3,433,176
Patented Mar. 18, 1969

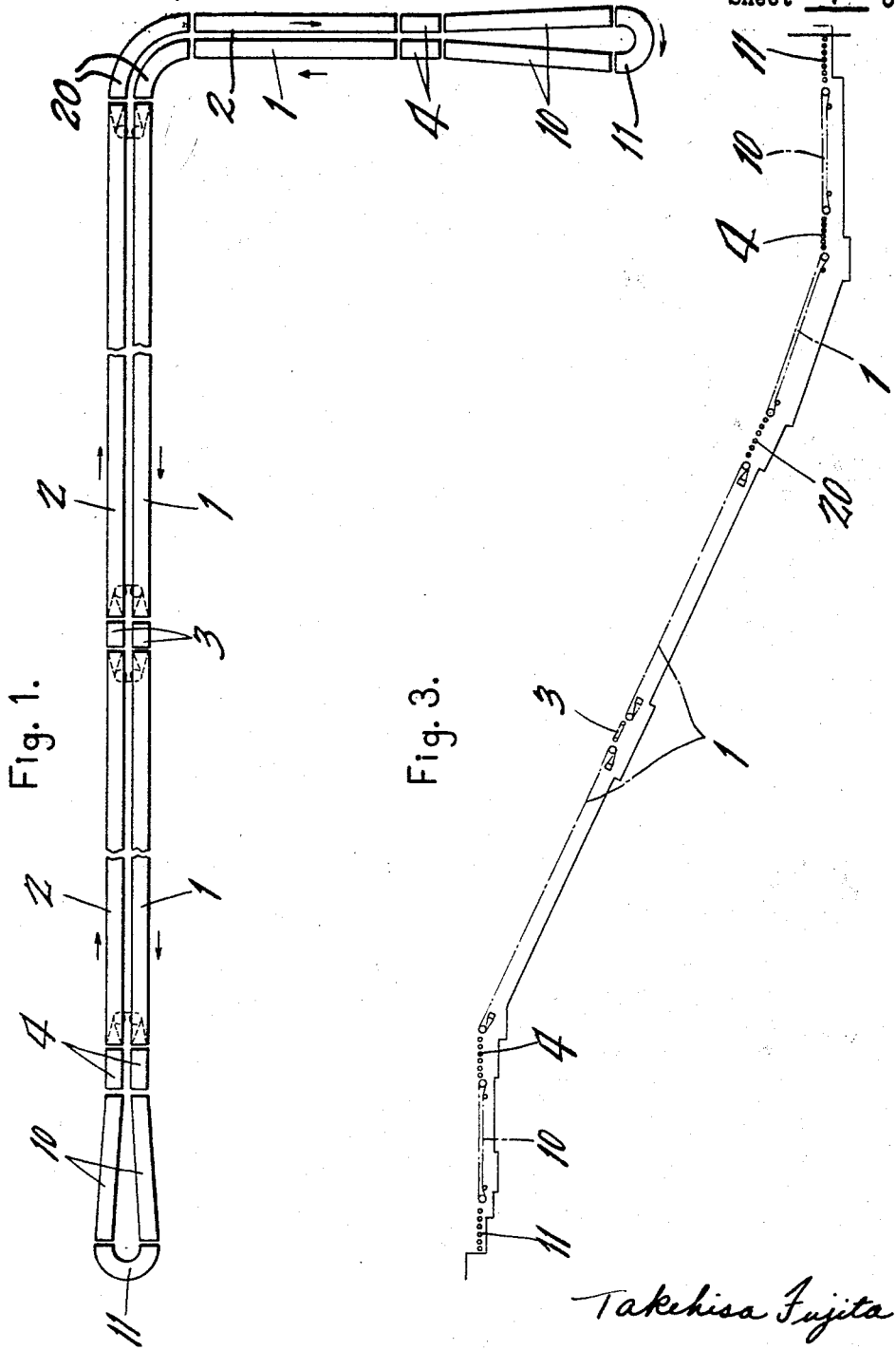

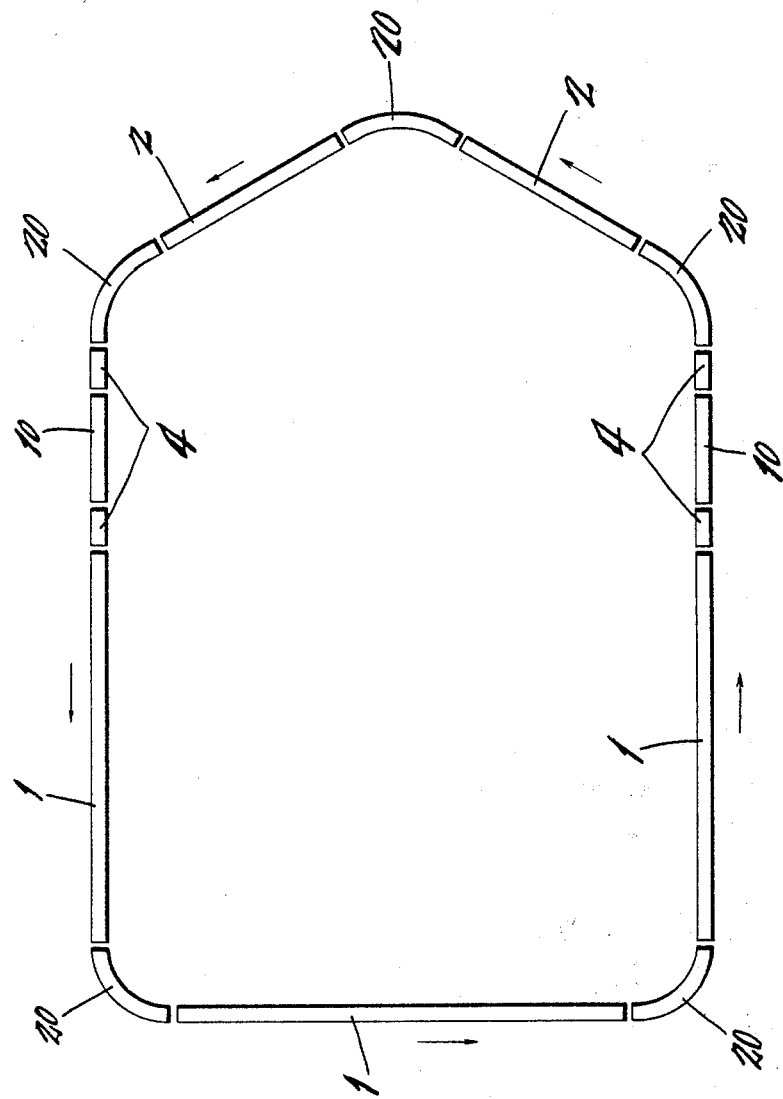

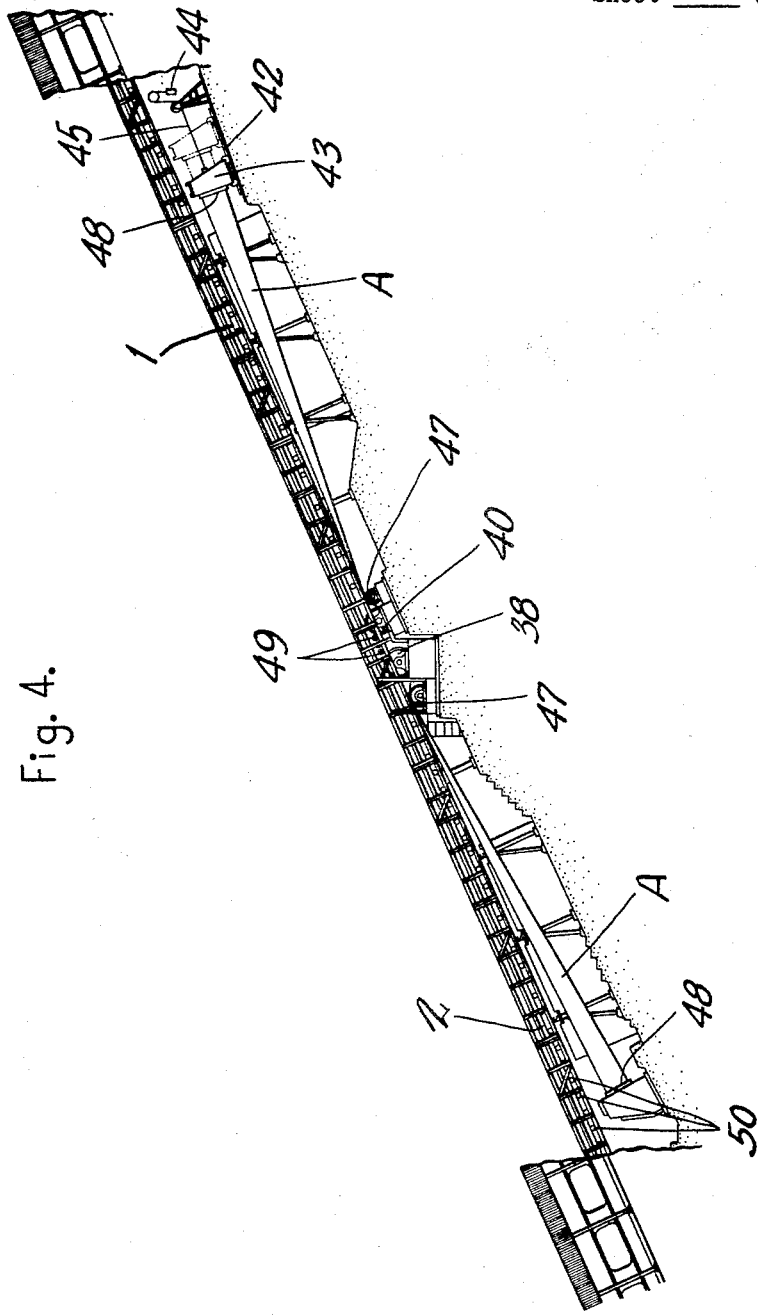

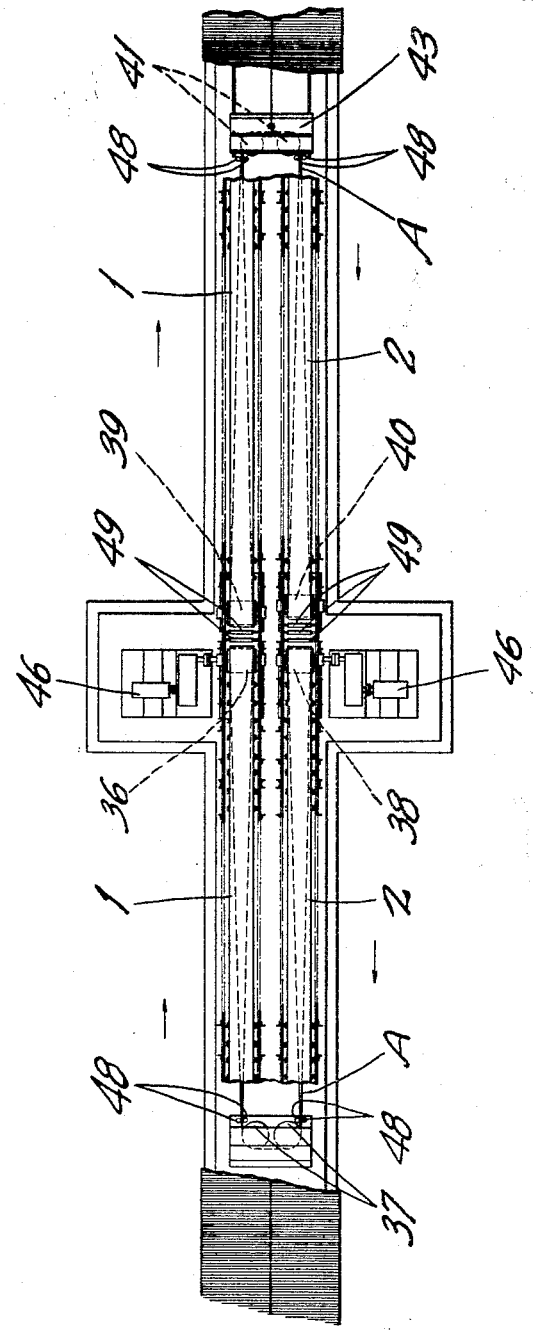

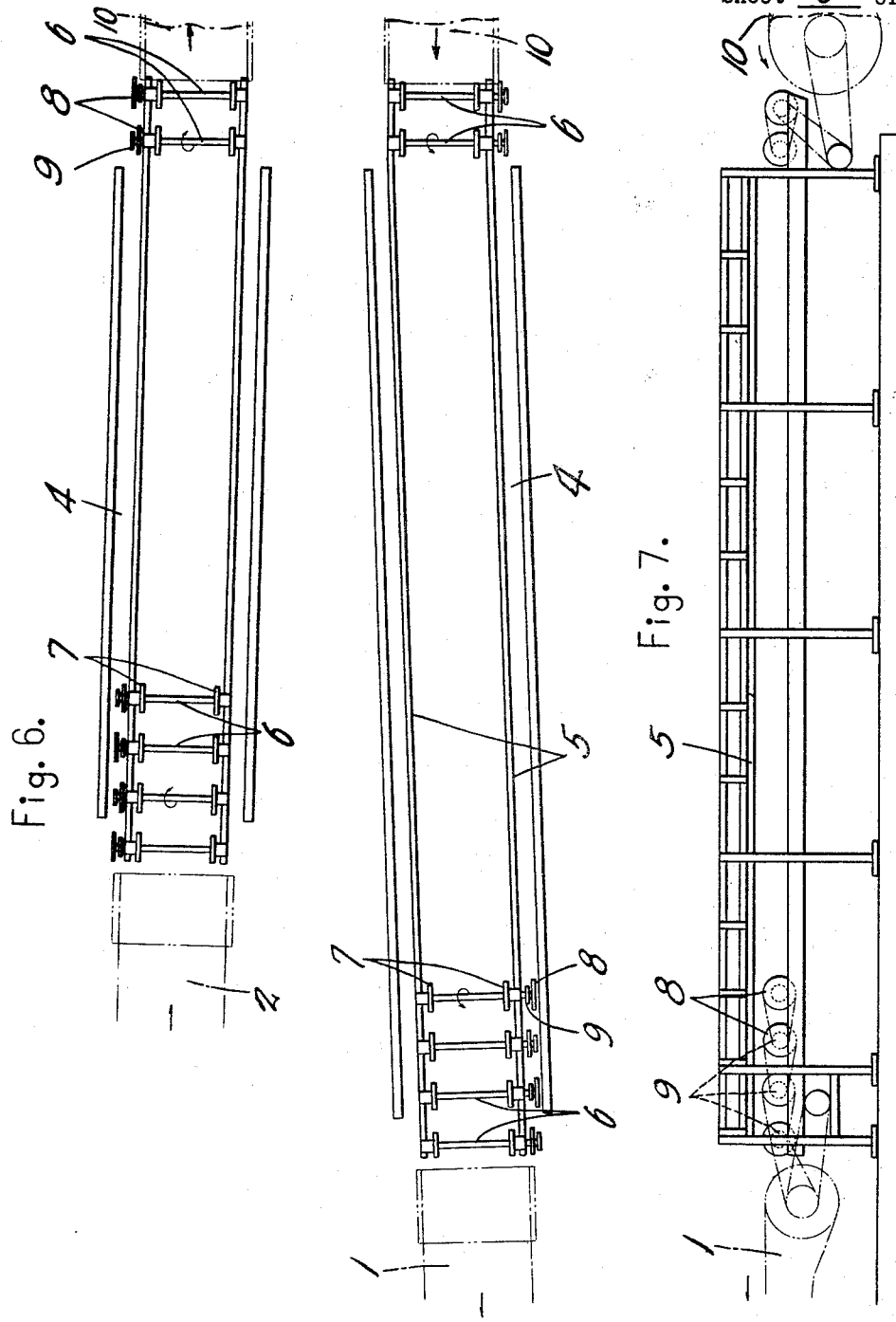

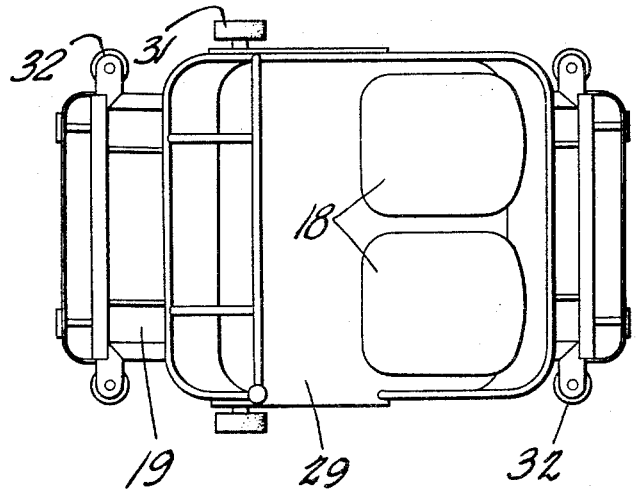
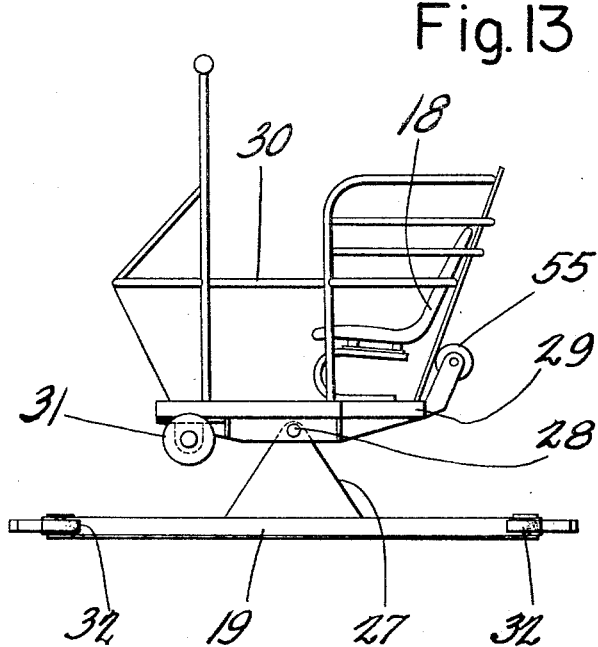

3,433,176
TRANSPORT APPARATUS PARTICULARLY FOR CONVEYING PERSONNEL
Takehisa Fujita, Fuse, Japan, assignor to Nippon Conveyor Co., Ltd., Osaka-fu, Japan
Filed Nov. 22, 1965, Ser. No. 509,109
Claims priority, application Japan, Dec. 10, 1964, 39/70,895
U.S. Cl. 104—20    3 Claims
Int. Cl. B61b *3/00, 13/04*

ABSTRACT OF THE DISCLOSURE

A transport apparatus comprising, in the recited order, a first slow speed conveyor, a first variable speed conveyor, at least one high speed conveyor, a second variable speed conveyor, a second low speed conveyor, a third variable speed conveyor, at least one further high speed conveyor, and a fourth variable speed conveyor, said conveyors being arranged in a closed loop, guide means along at least one side of the path of said conveyors, and article carrying means carried by said conveyors, said article carrying means including friction means engaging said conveyors for causing the conveyors to move the article carrying means, and guide engaging means on said article carrying means engaged with said guide means for holding the article carrying means in an upright position and guiding the article carrying means in a path along the conveyors.

---

The present invention relates to a transport apparatus by which men or goods loaded on a support for articles to be carried which in turn is mounted on a friction supporting plate and during the transportation, the supporter for articles to be carried is carried by the conveyor due to the friction between the friction supporting plate and the conveyor means.

Objects of the present invention are to provide a conveyer apparatus in a loop form or in an optional form by combining a main belt conveyer, a variable speed conveyer, a turn-conveyer, a roller conveyer and the like, and to load men or goods on the supporter for articles to be carried and then transport them.

Where ascending and descending of men or goods is desired, the transport apparatus of the present invention permits them to ascend and descend safely by decreasing the running speed of the conveyer, and following the portion of the conveyer for ascending and descending is a speed variable conveyer arranged to cause the speed of the article supporter moving between the ascending and descending conveyer and the main conveyer to smoothly change speed, so that by driving the main conveyer at a relatively high speed transport efficiency can be improved. Also, the supporter for articles to be carried causes the friction between the conveyer and the friction supporting plate to increase dynamically by a lever action on the friction supporting plate, and the article supporter is stabilized. Where men or goods change from one belt to another, the change is very smoothly carried out without an impediment, and the supporter for articles to be carried, carrying men or goods, is efficiently transported by means of the friction supporting plate located on the conveyer.

Figure 8:
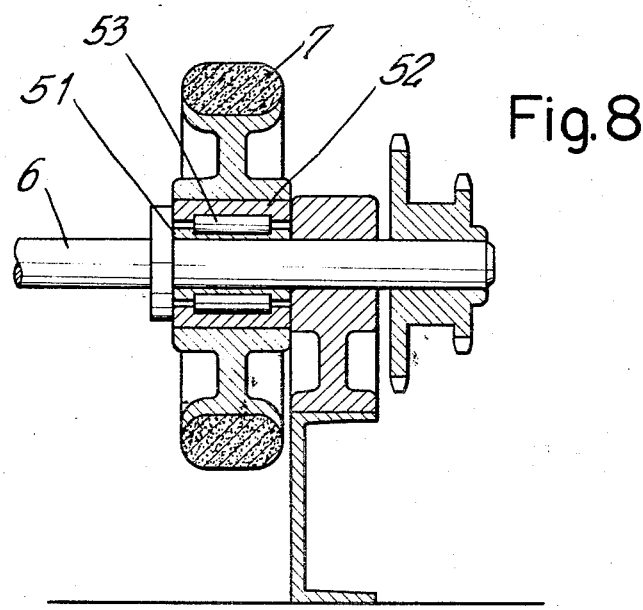
Figure 9:
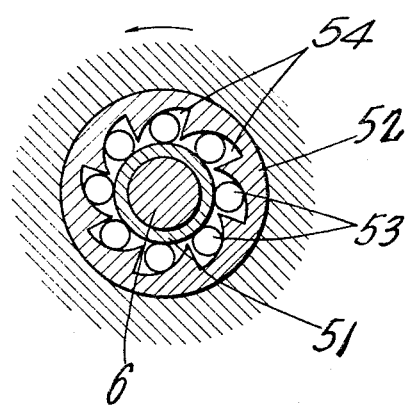
Figure 11:
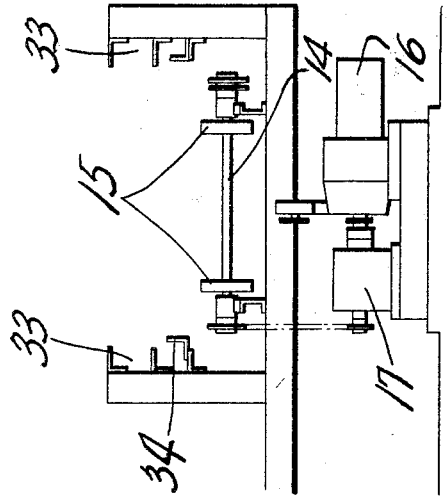
Figure 10:
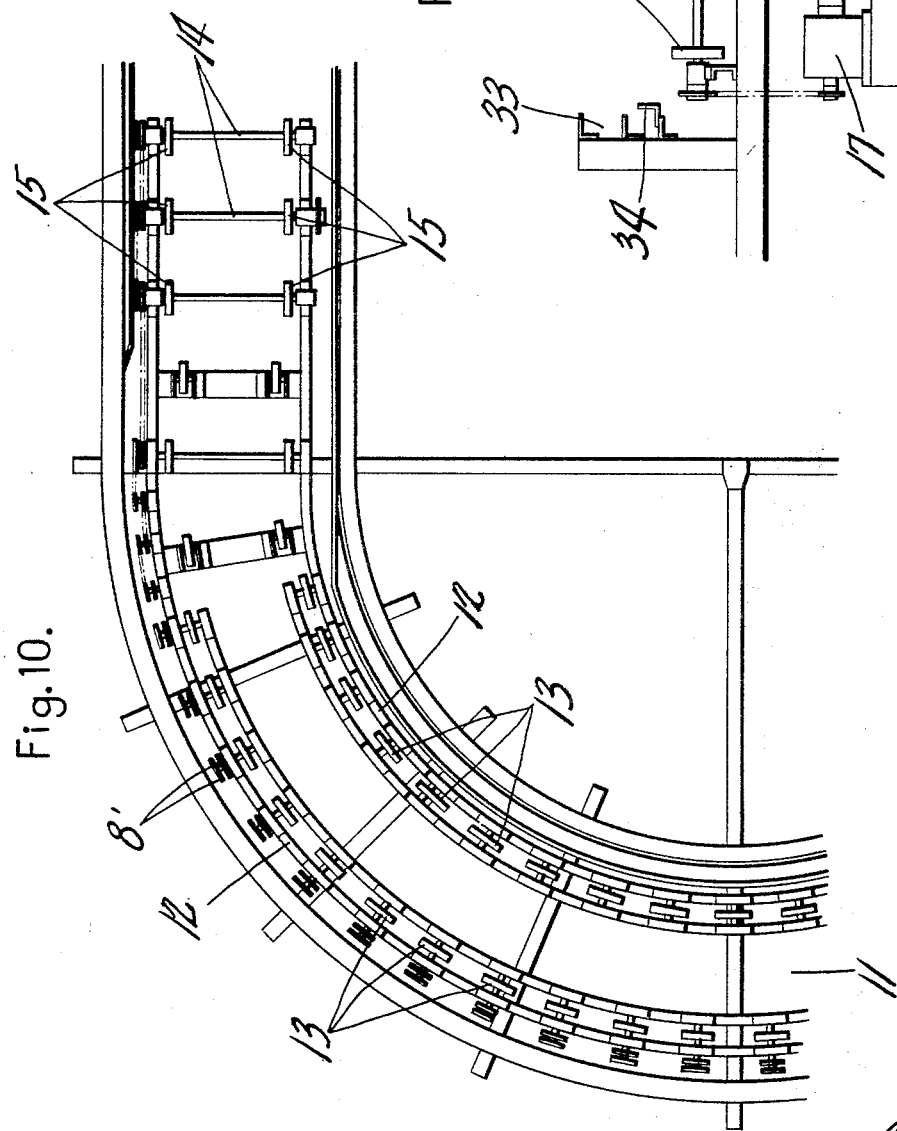
Figure 14:
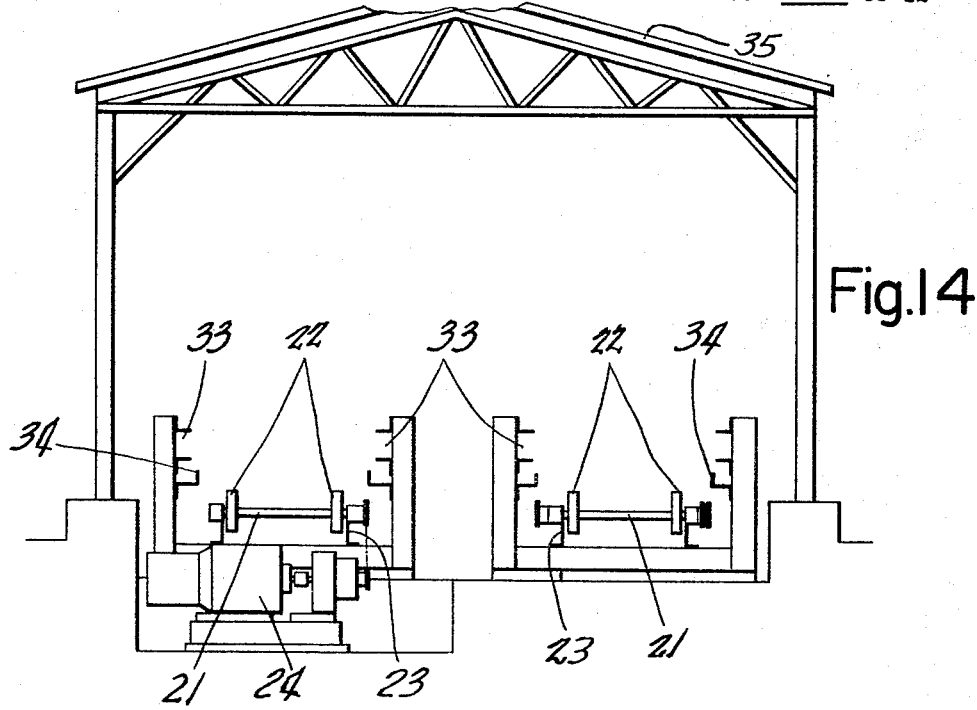
Figure 15:
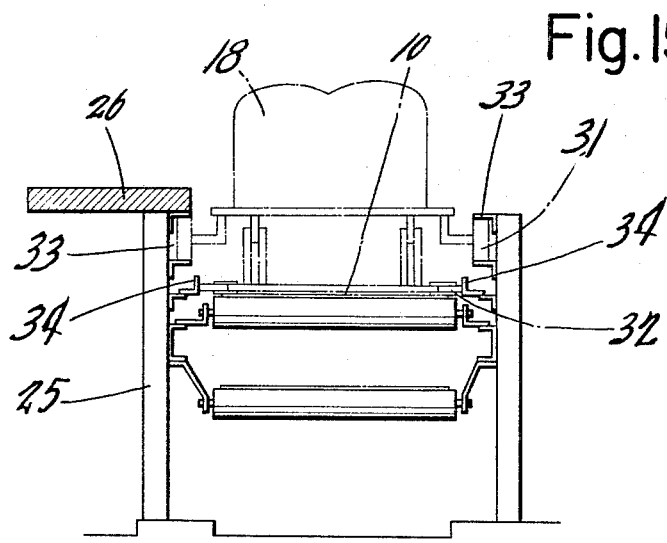
Figure 16:
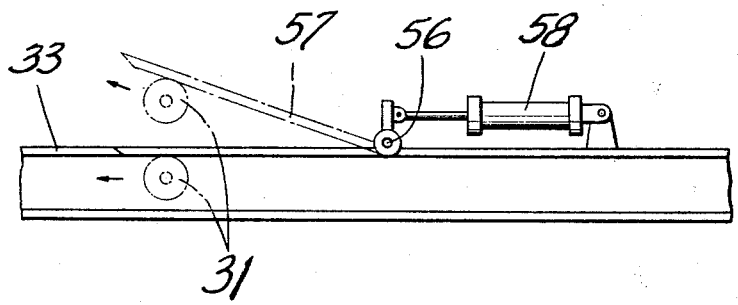
Figure 17:
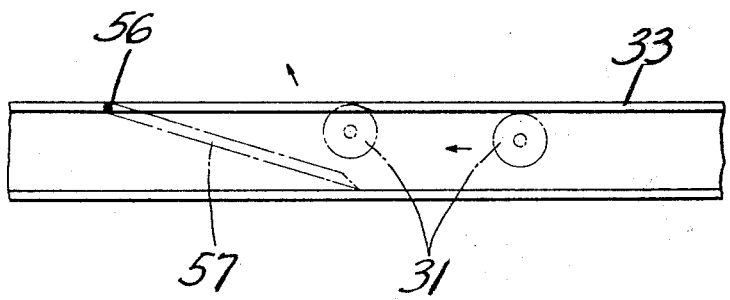

Many objects and advantages of the present invention will be illustrated by embodimenets shown in the attached drawings:

FIGURES 1 and 2 are schematic plan views showing a conveyer apparatus of the present invention;
FIGURE 3 is a view in side elevation of the apparatus shown in FIGURE 1;
FIGURE 4 is a view in side elevation showing a part of a main conveyer;
FIGURE 5 is also a plan view showing a part of the main belt conveyer;
FIGURE 6 is a plan view showing a part of the speed variable conveyer;
FIGURE 7 is a side elevation view thereof;
FIGURE 8 is a sectional view of a rubber roller in a speed variable conveyer;
FIGURE 9 is a sectional view on line 9—9 of FIG. 8;
FIGURE 10 is a plan view showing a part of a turn-conveyer;
FIGURE 11 is an end elevation view showing a driving portion of a turn-conveyer;
FIGURE 12 is a plan view showing a chair;
FIGURE 13 is a side elevational view thereof;
FIGURE 14 is an end elevation view of a part of the conveyor;
FIGURE 15 is a partial sectional view of part of the conveyer;
FIGURES 16 and 17 are side views of alternative forms of a movable plate installed in an upper supporting rail;
FIGURES 18, 19, 20 and 21 are diagrams dynamically illustrating the action of the supporter for articles to be carried.

The conveyer apparatus shown in FIGURE 1 shows, as an example, the case in which the transporting path and the return path are comparatively close, and the conveyer apparatus shown in FIGURE 2 shows, as an example, the conveyor apparatus in a loop form.

Thus, the main part of this apparatus consists of the main high speed belt conveyers 1 and 2, and if the conveyer apparatus is long, these conveyers are formed by aligning a plurality of conveyers having a certain length, and by connecting them by short roller conveyers 3.

Each of said conveyers 1, 2 and 3 is naturally the same speed. Between the main conveyer and the conveyer for getting on and off, which is installed at optional places along the conveyer apparatus are positioned variable speed conveyers 4 which are roller type conveyers, belt type or other types. For this conveyer 4 if it is a roller conveyer, it can be made as shown in FIGURES 6 and 7 described hereinafter.

Moreover, if the conveyer having a transporting path and a return path constituted by an endless belt, when the transporting path and return path are positioned close to each other and parallel as in FIGURE 1, the load can be counterbalanced when the conveyer extends along a slope as shown in FIG. 3. FIGURES 4 and 5 show the arrangement in which the belt A of conveyer 1 is reversed by running downwards around an end pulley 36, then twisting 90° and turning transversely and reversing direction around vertical guide rollers 37 positioned below a portion of conveyers 1 and 2. The belt A again twists 90° and runs upward around an end pulley 38 of conveyer 2 and then becomes the upper run of the conveyer 2 along the return path.

Likewise the end portion of the next conveyers 1 and 2 has the belt running downwards around end pulleys 39 and 40, twisted 90° and extending around vertical pulleys 41, so that the transport path and return path are formed by one belt. The pulleys 41 are mounted in frame 43 so that they can be advanced and retracted on rail 42 and so that frame 43 acts as a tension pulley causing the belt to be tensioned by a weight 44 on a rope 45 running over appropriate pulleys.

The pulleys 36 and 38 are driven by motors 46 to run the conveyers 1 and 2. Moreover, the belt A has the lower side supported by supporting pulleys 47 adjacent pulleys 36, 38, 39 and 40. Where the belt A engages with pulleys 37 and 41 there are pairs of opposed guide rollers 48 which press against both sides of the belt A and support the belt A longitudinally. The belt A is supported by carrier rollers 50 in the transport path and the return path. Rollers 49 form a roller conveyer which acts as a connecting conveyer between the corresponding belt portions 1 and 2 of the conveyer portions. Instead of these rollers, belt conveyers can be used such as the belt conveyers 3 shown in FIGURES 1 and 3.

Shown in FIGURES 6 and 7 is a variable speed conveyer of the roller type. Between a pair of right and left frames 5 is mounted a plurality of rotatable shafts 6. Each individual shaft 6 has a pair of the right and left rubber material rollers 7. A free wheel device is included in each roller 7 and as shown in FIGS. 8 and 9 comprises a plurality of small rollers 53 between an inner wheel 51 mounted on the shaft 6 and an outer wheel 52 mounted in the center of the roller 7.

Each roller 53 is movably fitted in a gullet 54 formed in the inner periphery of the outer wheel and is movable slightly therein. When the shaft 6 and the roller 7 rotate in the direction of the arrow, if the speed of rotation of the inner wheel is greater than the outer wheel, the roller 53 is pinched between the inner and the outer wheels and unites the shaft 6 and the roller 7 as one body, and the driving force of the shaft 6 is being transmitted to the roller 7. On the other hand if the speed of rotation of the roller 7 is faster than that of the shaft 6, the roller 53 moves to the outer side of the inner wheel 51 and the wide portion of gullet and rotates freely and the shaft 6 and the roller 7 are no longer connected. This prevents slipping between the roller 7 and the friction supporting plate 19 (see FIG. 13) when a chair is on the rollers 7, and the rollers 7 can rotate freely at the same speed as the roller 7 having the fastest rotation. The upper sides of rollers 7 and the belts 1 and 2 are at the same level.

At the end of each shaft 6 are mounted a large and a small chain wheel 8 and 9 respectively, and between the chain wheel on one shaft and chain wheel 9 on the adjacent shaft is an endless chain. The end chain wheel 9 which is nearest to the conveyers 1 and 2 is drivingly connected with conveyers 1 and 2, and the speed of the belt of the conveyers 1 and 2 is equal to the peripheral speeds of the rollers 7 at the end of conveyer 4 adjacent conveyers 1 and 2, and rollers 7 are rotated in the same direction as the pulleys at the ends of conveyers 1 and 2.

The roller 7 on the end of each conveyer 4 next to the belt 1 rotates more rapidly than the next roller 7 due to the gear ratio between the chain wheels 8 and 9, so that the rotational speed of the rollers 7 decreases gradually in the direction toward the conveyers 10, which are the conveyers for getting on and off the conveyer apparatus.

Thus, the ends of said variable speed conveyers 4 adjacent the conveyers 10 for getting on and off and which are installed next in line in the conveyer apparatus have a lower speed than that of main conveyers 1 and 2, and their speed at said end is equal to the belt speed of the conveyers 10 for getting on and off, and the periphery of end roller 7 of the speed variable conveyer 4 which is adjacent to conveyer 10 runs in the same direction as conveyer 10.

In a circulating conveyor apparatus having a transporting path and a return path as shown in FIGURE 1, the conveyers 10 for getting on and off diverge from each other, and at the opposite end from the speed variable conveyer, a turn-conveyer 11 for turning the article supports is installed.

As shown in FIGURES 10 and 11, the turn-conveyer is constituted by outer and inner rubber rollers 13 rotatably mounted respectively on the outer and inner frames 12, which are bent in a semicircular arc, and two chain wheels 8' are mounted only on the outer roller 13 to rotate the outer rollers 13 through chains connected between respective chain wheels 8. The inner rollers 13 are freely rotatable.

Said turn-conveyer 11 is provided with a linear portion at both ends, in which linear portions are mounted rotatable shafts 14. The shafts 14 also have chain wheels thereon connected by chains, and a pair of the right and left rubber wheels 15 are fixed to the rotatable shafts. The chain wheels are connected with one of the outer rollers 13 to rotate at the same speed and in the same direction. One of the shafts 14 is driven through a reducing gear 17 from the motor 16 as shown in FIGURE 11, the other shafts 14 and the outer rollers 13 thus being driven by the motor 16.

The reason why the outer and the inner rollers 13 at the curved portion of the turn-conveyer 11 are separately rotatable, the outer rollers 13 being driven and the inner rollers 13 being idler rollers is to cause a difference of rotational speed between the outer and the inner rollers when a friction supporting plate 19 on which the supporter for articles to be carried such as a chair or compartment is mounted, turns on the outer and the inner roller 13.

If there is a curve in the path of the conveyer apparatus and its turning radius is larger than that of the curved conveyers 20 shown in FIGURES 1 and 3, rotatable shafts 21 on which rubber rollers 22 are mounted as shown in FIGURE 14 can be mounted between on the right and left curved frames 23 and each shaft 21 can be driven by a chain transmission from a motor 24 so that a high transport capacity can be obtained.

FIGURE 15 shows a portion of the conveyer for getting on and off, in which a platform 26 is constructed on the outer frames 25, and the belt is provided at a level lower by one step than the surface of the platform.

The chair 18 used as the supporter for articles to be carried and as shown in FIGURES 12 and 13 is fixed on a bed plate 29 pivotally mounted on the shaft 28 on the top of a pair of housings 27 laterally spaced on the friction supporting plate 19, an entrance for getting on and off being provided in a railing 30 constructed around the periphery of the bed plate. A pair of rollers 31 are mounted on the ends of a horizontal shaft on the front of the bed plate 29 and a weight 55 is provided on the rear of the bed plate, and rollers 32 rotatable horizontally are mounted at the front and the rear on opposite sides of the supporting plate 19. Rollers 31 move along upper supporting rails 33, and rollers 32 move along the right and the left supporting rails 34 provided along the full length of the conveyer path. Also, a roof 35 is installed along the full length of the conveyer path as shown in FIGURE 14, so that it can prevent the conveyer path from getting wet.

The friction supporting plate 19 is made of tough plate such as steel plate and its lower face roughened, or on the lower face of the friction supporting plate 19 a tough rubber plate or similar material plate is tightly secured in order to prevent slip between plate 19 and the conveyer. Moreover, in the said example, only two chairs 18 and a hand-rail 30 are mounted on the friction supporting plate as the supporter for articles to be carried. However, besides chair, the supporter for articles to be carried can have a compartment mounted on the friction supporting plate 19.

Also, it is sometimes necessary that one of the supporters for articles to be carried and running on the conveyer must be removed from the conveyer. In this case, as shown in FIGURE 16 a part of the upper side of the rail 33 has an opening therein, and a movable plate 57 mounted on a pivoted shaft 56 can be freely moved up and down by a driving apparatus such as oil pressure cylinder 58 or manual handle.

In such a case, if the movable plate 57 is lowered to the position shown in full lines in FIGURE 16, the said plate 57 fills up the opening and forms a part of upper side of the rail 33, and the roller 31 of transporter moves along the face of the plate 57 under the usual conditions. If the movable plate 57 is raised to the position shown in dotted lines, however, since an upward force always acts on the roller 31 due to the weight 55, roller 31 is lifted from the rail 33 and runs along the lower face of the inclined plate 57. Therefore, as soon as this transporter is removed by a suitable means, the movable plate is returned to the original position, and the next transporter pass along the rail 33 under the usual conditions and does not leave the rail 33. The movable plate 57 can be mounted to be moved downwards into the rail 33 as shown in FIGURE 17. In this case, when the roller 31 arrives at the opening part, it leaves the rail 33 by running along the upper surface of the plate 57.

The apparatus according to the present invention is as set forth above, and its operation will be illustrated in detail below.

A chair 18 on a friction supporting plate 19 fed to the conveyer 10 for getting on and off from the last roller 13 of the turn-conveyer 11 shown in the right lower corner of FIGURE 1 is running in the direction of the arrow and is moved at a low speed on the conveyer 10, e.g. 30 m./min., so that during this time men can get into the chair 18 from the platform 26. The friction supporting plate 19 having the chair on which the men are sitting is moved onto the variable speed conveyer 4 from the conveyer 10.

On this conveyer 4, as set forth above, since the speed of rotation of the successive rollers 7 is increased in the direction toward the conveyer 1, the friction supporting plate 19 moving toward the conveyer 1 is accelerated gradually, until the speed of the friction supporting plate becomes faster than, e.g. 90 m./min., which is three times as fast as the initial speed, at the time the friction supporting plate moves onto the conveyer 1.

Then, at this speed, men sitting on the chairs 18 are carried by the conveyers 1, 3 etc., to the desired place. Then at the left end of FIGURE 1, the variable speed conveyer 4 having a construction similar to that in the place for getting on reduces the speed of the transporters gradually to a low speed, such as about 30 m./min., and then the conveyer 10 carrys the friction supporting plate at a speed of 30 m./min., so that the men can get off the chairs.

Then, the friction supporting plate 19 carrying empty chairs is carried on the turn-conveyer 11 and the conveyer 10 and returns to the original place along the conveyer 2 for the return path after loading men on it in the same manner as at the other end. The plates 19 carrying the reloaded chairs are then returned to the starting point.

FIGURE 2 shows a loop form differing from the form shown in FIGURE 1.

In the conveyer having a loop form or a circulating form if there is a slope in the path of the loop, by changing the distance between the rail 33 and the upper face of the conveyer, and by changing the angle of the chair 18 relative to the supporting plate, the chair is always kept horizontal and it is comfortable to sit in, even if the conveyer is inclined.

In the present invention, the weight added to the supporter for the articles to be carried constitutes device to increase the friction force, and its action will be described below.

Figure 18:
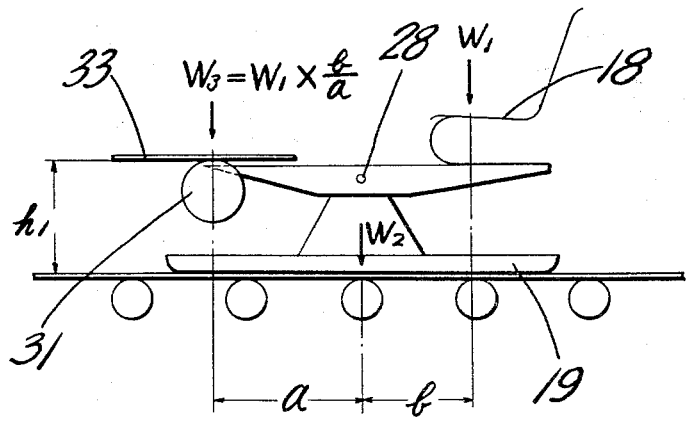

Namely, in FIGURE 18, suppose the weight $W_1$ is the weight added to the supporter for the articles to be carried, the weight $W_2$ is the weight of the supporting plate 19, the reaction force $W_3$ is the force applied to the roller 31 from the rail 33, the distance $a$ is the distance between the center of the roller 31 and the center of the shaft 28, and the distance $b$ is the distance between the center of the shaft and the center of the load added to the chair. When the supporter for articles to be carried and the supporting plate are horizontal, $$W_3 = W_1 \times b/a$$

Figure 19:
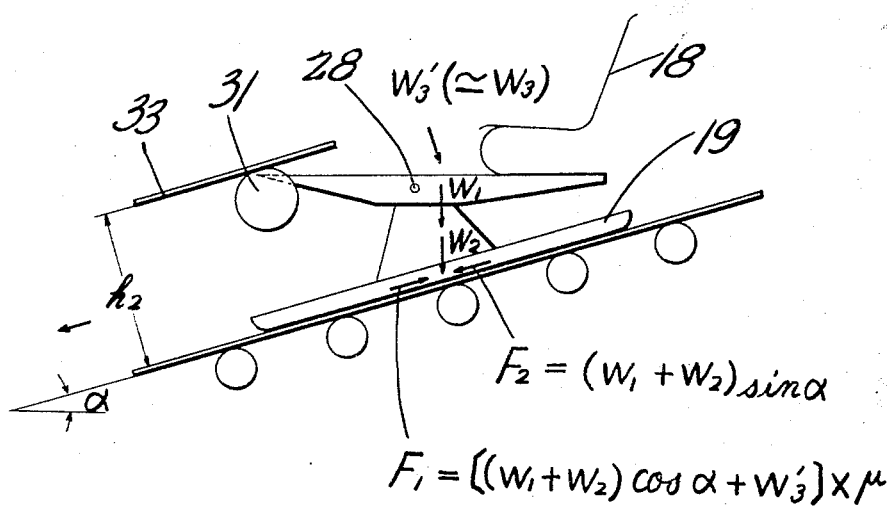

Also, when the supporting plate 19 is inclined due to the inclination of the belt and the supporter for articles to be carried is horizontal, as shown in FIGURE 19, suppose the reaction force added to the supporter for articles to be carried from the roller portion 31 to be $W_3'$. If the weight $W_1$ of the chair portion 18 and the weight $W_2$ of the supporting plate 19 are added to the supporting plate 19, the friction force $F_1$ between the supporting plate 19 and the belt can be given as $$F_1 = \{(W_1 + W_2) \cos \alpha + W_3'\} \times \mu$$

Also, the sliding force $F_2$ due to the inclination is $$F_2 = (W_1 + W_2) \sin \alpha$$

Thus, if $W_3'$ is increased $F_1$ can be larger than $F_2$, but since $W_3'$ nearly equals $W_3$, by changing $b/a$ in FIGURE 18, $F_1 > F_2$ is obtainable. Namely, even if $W_1$ and $W_2$ are small, if the value $b/a$ is made larger, the friction force $F_1$ can be made larger. By adding weight 55 to the supporter for the articles to be carried and by increasing value $W_1$ a larger friction force can be obtained.

Figure 20:
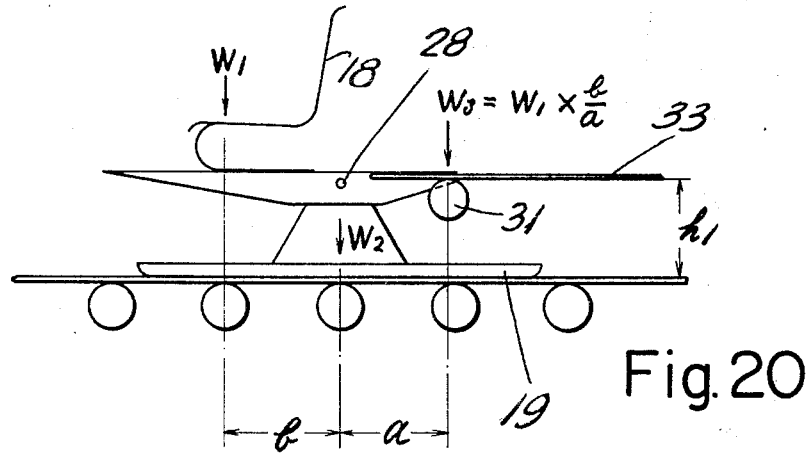
Figure 21:
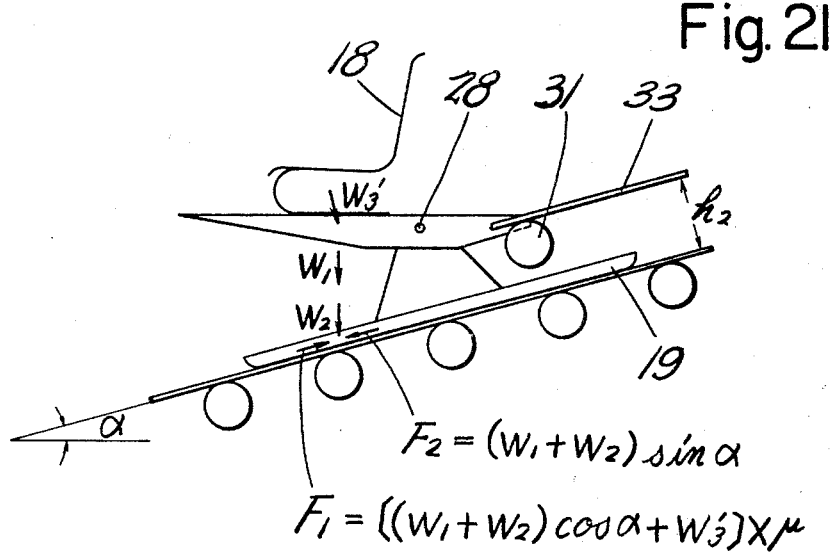

As shown in FIGURES 20 and 21, the load $W_1$ on the chair can be added sufficiently on the one hand, and a reaction force can be added to the roller 31 from the rail on the other hand by putting the shaft 28 between them. It is enough to place the weight on the same side as the chair 18. In addition, in FIGURES 18 to 21, by properly establishing the distances $h_1$ and $h_2$ between the belt and the rail 33 the supporter for articles to be carried is always kept horizontal in spite of any slope of the belt.

The present invention contains the following effects which cannot be obtained with other kinds of conveyers by arranging various types of conveyers in a closed path and by providing excellent individual conveyers. By allowing the conveyer to run at an extremely slow speed at the portion of the conveyer for getting on and off, getting on and off can be achieved safely, and by arranging the variable speed conveyer next in line to the conveyer for getting on and off, the difference in speed between the main conveyer and the conveyer for getting on and off can be changed smoothly, so that the main conveyer can be driven at a considerable speed and its transport efficiency can be improved.

Also, since the support for articles to be carried, such as a chair or a compartment, is fixed on the friction supporting plate and the friction supporting plate and the individual belts are joined only by friction, a smooth transference can be carried out without any impediment at the portion between the individual belts.

Thus, according to the present invention conveying of men and goods can be carried out very safely and efficiently by a combination of various conveyers and with the supporter for articles to be carried mounted on the friction supporting plate.

The preferred embodiments of the present invention have been illustrated, but it will be understood that it is possible to add many modifications to its constructions and the scope of the present invention is limited only by the appended claims.

What I claim is:

1. A transport apparatus comprising, in the recited order, a first slow speed conveyor, a first variable speed conveyor, at least one high speed conveyor, a second variable speed conveyor, a second low speed conveyor, a third variable speed conveyor, at least one further high speed conveyor, and a fourth variable speed conveyor, said conveyors being arranged in a closed loop, a channel member along at least one side of the path of said conveyors and open toward the conveyors, and article carrying means carried by said conveyors, said article carrying means including friction means engaging said conveyors for causing the conveyors to move the article carrying means, an article carrying platform and a conveyor engaging member on which said article carrying platform is pivotally mounted for pivotal movement around a horizontal axis, and rollers on said article carrying platform, said article carrying platform having the rollers projecting therefrom in a direction parallel to the direction of movement of the conveyors and further having a counterbalance weight projecting therefrom applying a moment to said article carrying platform which holds said rollers engaged with a portion of said channel member which extends toward the conveyors for holding the article carrying means in an upright position and guiding the article carrying means in a path along the conveyors.

2. A transport apparatus as claimed in claim 1 in which a portion of said conveyors are on an incline, and said channel member along said incline has the portions thereof which project toward the conveyor spaced farther from each other than the portions along the level portions of said conveyors, said counterbalance weight applying a moment to said article carrying platform which tilts the article carrying platform around said pivotal axis in a direction to keep it level.

3. A transport apparatus comprising, in the recited order, a first slow speed conveyor, a first variable speed conveyor, at least one high speed conveyor, a second variable speed conveyor, a second low speed conveyor, a third variable speed conveyor, at least one further high speed conveyor, and a fourth variable speed conveyor, said conveyors being arranged in a closed loop, guide means along at least one side of the path of said conveyors, at least one of said variable speed conveyors comprising a plurality of parallel shafts having rollers mounted thereon, driving means connected to said rollers for driving said rollers at successively different speeds, said rollers being mounted on said shafts for being driven when the shaft is rotating faster than the roller and for free wheeling when the roller is being driven faster than the shaft, and article carrying means carried by said conveyors, said article carrying means including friction means engaging said conveyors for causing the conveyors to move the article carrying means, and guide engaging means on said article carrying means engaged with said guide means for holding the article carrying means in an upright position and guiding the article carrying means in a path along the conveyors.

References Cited

UNITED STATES PATENTS

| | | | |
|---|---|---|---|
| 2,905,100 | 9/1959 | Kendall | 104—20 |
| 2,936,873 | 5/1960 | Seidman | 104—20 |
| 2,973,720 | 3/1961 | Bourassa | 104—20 |
| 3,236,191 | 2/1966 | Bouladon | 104—20 |
| 2,641,354 | 6/1953 | Kingsbury | 104—25 |
| 2,905,100 | 9/1959 | Kendall | 104—25 |
| 2,905,101 | 9/1959 | Sinden | 104—25 |
| 3,185,108 | 5/1965 | Muller | 104—25 |

ARTHUR L. LA POINT, *Primary Examiner.*

DANIEL F. WORTH, *Assistant Examiner.*

U.S. Cl. X.R.

104—25